United States Patent
Sloop et al.

(10) Patent No.: US 12,278,351 B2
(45) Date of Patent: Apr. 15, 2025

(54) ELECTROCHEMICALLY RECYCLING A LITHIUM-ION BATTERY

(71) Applicant: Hulico LLC, Bend, OR (US)

(72) Inventors: Steven E. Sloop, Bend, OR (US); Lauren E. Crandon, Bend, OR (US)

(73) Assignee: HULICO LLC, Bend, OR (US)

( * ) Notice: Subject to any disclaimer, the term of this patent is extended or adjusted under 35 U.S.C. 154(b) by 616 days.

(21) Appl. No.: 17/668,257

(22) Filed: Feb. 9, 2022

(65) Prior Publication Data

US 2022/0271356 A1 Aug. 25, 2022

Related U.S. Application Data

(60) Provisional application No. 63/148,095, filed on Feb. 10, 2021.

(51) Int. Cl.
| | |
|---|---|
| *H01M 10/00* | (2006.01) |
| *B01J 19/00* | (2006.01) |
| *B01J 19/08* | (2006.01) |
| *C01G 53/44* | (2025.01) |
| *H01M 4/04* | (2006.01) |

(Continued)

(52) U.S. Cl.
CPC ......... *H01M 10/54* (2013.01); *B01J 19/0013* (2013.01); *B01J 19/088* (2013.01); *C01G 53/44* (2013.01); *H01M 4/0438* (2013.01); *H01M 4/0471* (2013.01); *H01M 4/505* (2013.01); *H01M 4/525* (2013.01); *B01J 2219/00033* (2013.01); *B01J 2219/0801* (2013.01); *B01J 2219/089* (2013.01); *C01P 2002/50* (2013.01);

(Continued)

(58) Field of Classification Search
CPC .... H01M 10/54; H01M 4/0438; H01M 4/505; H01M 4/525; H01M 2004/028; C01G 53/44; B01J 19/088; Y02E 60/10
See application file for complete search history.

(56) References Cited

U.S. PATENT DOCUMENTS

2016/0049701 A1 2/2016 Kepler et al.

FOREIGN PATENT DOCUMENTS

CA 3144711 A1 * 2/2021 ........... C01D 15/005

OTHER PUBLICATIONS

Adermann et al., Process for the Recovery of Lithium From Waste Lithium Ion Batteries, Feb. 2021, See the Abstract. (Year: 2021).*

(Continued)

*Primary Examiner* — Anca Eoff
*Assistant Examiner* — Monique M Wills
(74) *Attorney, Agent, or Firm* — Alleman Hall & Tuttle LLP (57) ABSTRACT

Examples are disclosed that relate to methods and reactors for recycling a positive electrode material of a lithium-ion battery. One example provides a method of recycling a positive electrode material of a lithium-ion battery. The positive electrode material comprises a metal m having a n+ oxidation state ($m^{n+}$). A reaction mixture is formed comprising the positive electrode material, an oxidizing agent, and lithium ions. The positive electrode material is electrochemically replenished with lithium via electrochemical reduction of the lithium ions while maintaining the n+ oxidation state of the metal m in the positive electrode material via the oxidizing agent.

17 Claims, 8 Drawing Sheets

(51) Int. Cl.
    *H01M 4/505*     (2010.01)
    *H01M 4/525*     (2010.01)
    *H01M 10/54*     (2006.01)
    *H01M 4/02*     (2006.01)

(52) U.S. Cl.
    CPC ... *C01P 2006/40* (2013.01); *H01M 2004/028* (2013.01)

(56) References Cited

OTHER PUBLICATIONS

Sloop, S. et al., "Cathode healing methods for recycling of lithium-ion batteries," Sustainable Materials and Technologies, vol. 22, May 1, 2019, 8 pages.

Yang, T. et al., "An Effective Relithiation Process for Recycling Lithium-Ion Battery Cathode Materials," Advanced Sustainable Systems, vol. 4, Dec. 9, 2019, 6 pages.

\* cited by examiner

ELECTROCHEMICALLY RECYCLING A LITHIUM-ION BATTERY

CROSS REFERENCE TO RELATED APPLICATIONS

This application claims priority to U.S. Provisional Patent Application Ser. No. 63/148,095, filed Feb. 10, 2021, the entirety of which is hereby incorporated herein by reference for all purposes.

TECHNICAL FIELD

The present application relates to the field of lithium-ion batteries, and more particularly, to relithiating spent electrode materials of a lithium-ion battery.

BACKGROUND

Lithium-ion batteries provide power to products ranging from automobiles to smart phones. These batteries are rechargeable over many cycles, tolerant to various environmental factors, and have a relatively long useful lifetime. Nevertheless, they eventually fail or are discarded prior to failure, and therefore contribute to a significant waste stream. Accordingly, environmental regulations, industry standards, and collection services have arisen to promote the recycling of lithium-ion batteries.

SUMMARY

One example provides a method of recycling a positive electrode material of a lithium-ion battery. The positive electrode material comprises a metal m having a n+ oxidation state ($m^{n+}$). A reaction mixture is formed comprising the positive electrode material, an oxidizing agent, and lithium ions. The positive electrode material is electrochemically replenished with lithium while maintaining the n+ oxidation state of the metal m in the positive electrode material via the oxidizing agent.

Another example provides a continuous-flow reactor for recycling a positive electrode material of a lithium-ion battery. The continuous-flow reactor comprises a reactor chamber and an input system configured to input a reaction mixture into the reactor chamber. The continuous-flow reactor also comprises a conveyor configured to move the reaction mixture through the reactor chamber, a first electrode, a second electrode configured to contact the positive electrode material, and a current source in electrical connection with the first electrode and the second electrode.

DETAILED DESCRIPTION

Spent lithium-ion positive electrode materials may have depleted levels of lithium relative to new materials. Recycling processes for spent lithium-ion positive electrode materials thus may include relithiation of the spent positive electrode material, wherein "relithiation" indicates the reintercalation of lithium into the positive electrode material. Relithiation may be performed in various manners. For example, relithiation may be performed via hydrothermal treatment of the spent positive electrode material in an aqueous lithium ion solution, such as a lithium hydroxide solution. Examples of such recycling processes are disclosed in U.S. application Ser. No. 14/820,504 titled RECYCLING POSITIVE ELECTRODE MATERIAL OF A LITHIUM-ION BATTERY filed Aug. 6, 2015, the entire contents of which are hereby incorporated by reference. Various example relithiation techniques are also described in U.S. Pat. No. 8,846,225 titled REINTRODUCTION OF LITHIUM INTO RECYCLED BATTERY MATERIALS, U.S. application Ser. No. 16/415,879 titled RELITHIATION IN OXIDIZING CONDITIONS, the entire contents of which are also incorporated by reference. Other techniques proposed for relithiating spent lithium-ion electrode materials utilize electrochemical techniques.

Efficiency of recovery may depend on the type of electrode material being recycled. For example, a lithium-nickel-manganese-cobalt material (NMC) may be more sensitive to reducing factors in the environment. NMC materials are layered materials with hexagonal symmetry. However, a spent NMC battery material may include some cubic phase material as well, which lacks the layered structure of the hexagonal material, and can impede the performance of the material in a battery. Without wishing to be bound to theory, the cubic phase may arise from reduction of nickel(III) in the hexagonal material to nickel(II), which may form a cubic phase with cobalt(IV). Nickel(II) has a d6 (cubic) electron configuration, while nickel(III) has a d5 (hexagonal) electron configuration. The filled $t_{2g}$ d orbitals, with two electrons per orbital, provide paired electron stabilization and a full complement of electrons in the lower energy orbitals. In some examples, nickel-related stabilization dominates in NMC materials comprising greater than or equal to 50% nickel. Cobalt oxidation states may also be involved in various examples.

During relithiation, additional cubic material may be formed as the layered material is reduced to intercalate Li(I) ions into the lattice by reducing agents, such as carbon, residual electrolyte, and/or binder, and/or from other reducing conditions that may be present. This problem may be particularly noticeable in materials having fifty percent or more nickel ions compared to manganese and cobalt. Lithium cobalt oxide (LCO), another hexagonal layered battery material, may suffer similar structural issues. Lithium iron phosphate may suffer different issues during relithiation, but that also result from reduction of a metal ion. For example, intercalation of lithium into lithium iron phosphate (LFP) may cause reduction to iron(II) oxide.

Accordingly, the disclosed examples relate to electrochemically intercalating lithium into a spent electrode material while maintaining a metal ion in the material in a desired oxidation state, wherein the metal ion may be nickel and/or cobalt in NMC materials, cobalt in LCO, or iron in LPF, as examples. Briefly, the disclosed examples utilize an oxidizing agent in a relithiation solution. The oxidizing agent has been found to help convert cubic NMC phases to hexagonal NMC phases, and to help prevent the formation of cubic NMC phases, during relithiation. The oxidizing agent further may act as an oxygen donor, contributing oxygen to oxygen vacancies in an electrode material lattice that may arise from reduced nickel and/or other ions. In other examples, such as where a hydrogen electrode is used, oxygen atoms from water molecules may help to fill oxygen vacancies in the lattice. The disclosed examples further may be used to relithiate other materials, including but not limited to LCO and LFP materials.

Before discussing the disclosed examples of relithiation processes and electrochemical reactors for relithiation, an example recycling method 10 is described with reference to FIG. 1. It will be understood that various steps of method 10 may be omitted or performed in a different order than described, and that additional steps also may be included. At 12, a quantity of previously used positive-electrode material is harvested. The positive-electrode material may be harvested from any suitable source, such as a lithium-ion battery waste or recycling stream. In other embodiments, the positive-electrode material may be harvested from a generic waste or recycling stream. In some scenarios, the positive-electrode material may be harvested from batteries that have exceeded a recommended shelf life or recommended maximum number of recharge cycles. The term "spent" is used herein to indicate any waste-stream electrode material.

The harvesting enacted at 12 may include disassembly of one or more lithium-ion batteries and removal of the positive-electrode material therein. Typically, a lithium-ion battery includes a housing that supports positive and negative exterior terminals and encloses the positive and negative electrodes and non-aqueous electrolyte solution. Depending on the battery configuration, the housing may be breached by cutting, drilling, and/or prying, to expose the positive- and negative-electrode materials and the electrolyte. In some embodiments, the housing may be breached under an atmosphere of reduced oxygen and/or humidity. For example, the housing may be breached under a blanket of nitrogen, argon, or carbon dioxide. Such measures may help to prevent the negative electrode material (which may include metallic lithium or lithium-intercalated carbon) from igniting or releasing an undesirable amount of heat. The term "harvest" may refer to the entirety of, or any sub-part, of the process in which positive-electrode material is removed from batteries and provided to a recycling process. Thus the term "harvest" and the like may include obtaining the positive-electrode material from another entity that performed the removal of positive-electrode materials from batteries.

In some examples, the harvesting enacted at 12 will include removal of the housing and exterior terminals, the non-aqueous electrolyte, and the negative electrode. These components may be recycled separately, if desired. Removal of the housing, exterior terminals, non-aqueous electrolyte, and negative electrode leaves behind the positive electrode, which may include a positive-electrode material be supported on an aluminum or other metallic/conductive foil substrate. The positive-electrode material may also include a significant amount a polymeric binder (e.g., a fluoropolymer or styrene polybutadiene). In other examples, these materials may be separated at one or more later processing stages.

In some examples, the positive electrode material may include NMC with various ratios of Ni:Mn:Co, for example, 1:1:1; 5:3:2; 4:4:2; 6:2:2; 2:6:2. In other examples, the positive electrode material may include LPF, LCO, or other suitable material. Some other materials that may be used include negative electrode materials, such as lithium titanate ($Li_4Ti_5O_{12}$). As mentioned above, in the forms typically recovered from waste or recycling streams, these compounds may be lithium-deficient. In other words, they may contain less than the stoichiometric number of lithium ions ($Li^+$) compared with the originally manufactured lithium metal oxide material. Accordingly, the recycling method described herein replenishes the lithium content of the recycled positive-electrode materials.

Figure 1:
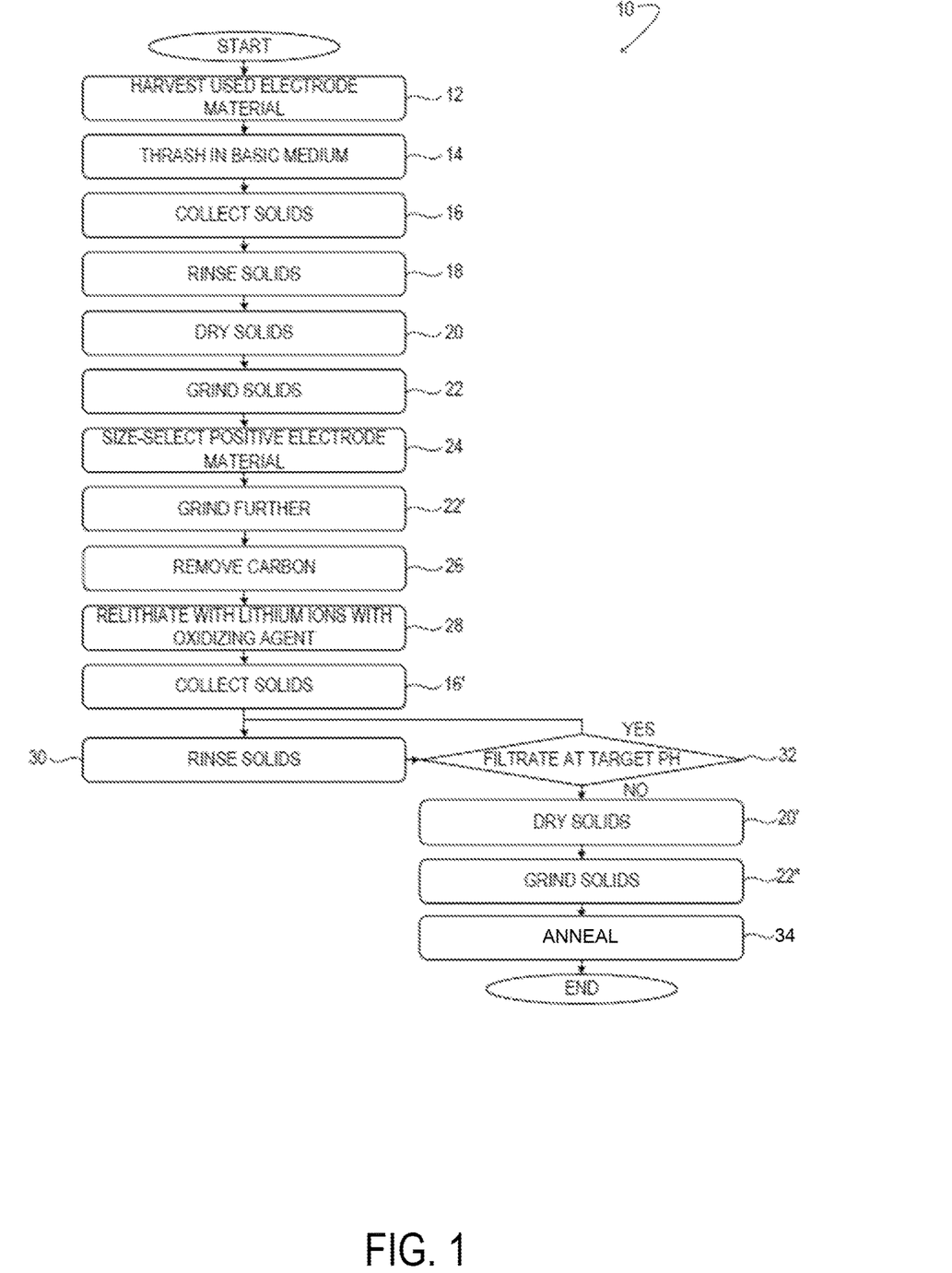
FIG. 1 shows a flow diagram illustrating a method of recycling an electrode material of a lithium-ion battery.

Continuing in FIG. 1, at 14 the supported positive-electrode material optionally may be mechanically thrashed in basic medium. This action mechanically separates (i.e., delaminates) the positive-electrode material from the support, partially separates the positive-electrode material and from the binder, and breaks each of these components down to a manageable particle size to facilitate subsequent mechanical and chemical processing. Thrashing in a basic medium—as opposed to an acidic or neutral media—has been found to lessen the rate of decomposition of the positive-electrode material during the thrashing process for some electrode materials, such as various NMC based materials. In some embodiments, the basic medium may be a liquid medium in which the positive-electrode material is suspended—e.g., an aqueous or non-aqueous solution. In some examples, the positive-electrode material may be suspended in a non-aqueous solvent, such as acetonitrile, DMSO, ethylene glycol, or an ionic liquid (e.g. a molten salt (e.g. lithium nitrate) above its melting point (e.g. 255° C. for lithium nitrate) or an organic ionic liquid such as bis (fluorosulfonyl) imide (FSI) as an anion and 1-ethyl-3-methylimidazolium (EMI) or N-methyl-N-propylpyrrolidinium (P-13). In some examples including an inorganic salt, the temperature may be between 200-1000° C. In some examples including an organic molten salt, the temperature may be between 80-300° C.

In a more specific example, the positive-electrode material is suspended in ambient-temperature water basified with lithium hydroxide (LiOH) to a pH in the range of 11.0 to 11.5. This pH range may be basic enough to retard acid hydrolysis of a positive-electrode material, but not so basic as to promote rapid oxidation of the aluminum foil support of the positive-electrode material, which could proliferate aluminum ions through the system. In other embodiments, different bases, solvents, and pH ranges may be used. In particular, the pH range may be adjusted based on the chemical identity of the positive-electrode material—e.g., a more basic pH range for more basic materials, and a less basic range for less basic materials. In one particular embodiment, the desirable pH for rinsing is the same as the pH that the suspended positive-electrode material imparts to deionized water. In some examples, an oxidizing agent, such as LiClO, hydrogen peroxide, lithium peroxide, or other suitable material, may be included in this solution.

Continuing in FIG. 1, as one non-limiting example, the thrashing of the suspended positive-electrode material may be conducted in a rotating-blade thrashing vessel, which may accommodate samples of one to ten liters. In other examples, any other suitable thrashing mechanism may be used, or thrashing may be omitted where suitable.

At 16 the various solids deriving from the supported positive-electrode material are collected from the thrashed slurry, where thrashing is performed. The solids may be collected by gravity filtration, pressure filtration, vacuum filtration, and/or centrifugation, for example.

At 18 the collected solids optionally may be rinsed with a liquid to remove the basic medium used in the thrashing, and to remove any electrolyte (salts and non-aqueous solvent) retained on the supported positive-electrode material prior to thrashing. The rinsing may be done in the filtration or centrifugation apparatus used for solids collection. In some embodiments, an organic solvent may be used for the rinsing. It is desirable that the chosen solvent be partially or fully miscible with water, so that the rinsing process also removes entrained water (from the basic thrashing medium) from the collected solids. It is also desirable that the solvent be recoverable from the rinsings, innocuous to workers and to the environment, and/or suitable for inexpensive disposal compliant with applicable laws. Acetone, ethanol, and some other alcohols may be suitable due to their miscibility with water, relatively low toxicity, and ability to dissolve the solvents and salts of the non-aqueous electrolyte (e.g., lithium hexafluophosphate and its decomposition products such as LiF and various phosphates, lithium triflate, ethylene carbonate, diethyl carbonate, etc.). Acetone and ethanol are also potentially recoverable from the rinsings by distillation at reduced pressure.

Acetone has additional attractive properties as a rinse solvent because it is a good solvent for organics and a relatively poor solvent for LiOH. More specifically, various organic compounds—e.g., low molecular-weight polymers and fluoropolymers, plasticizers, etc.—may be present in the binder, which is used to adhere the positive-electrode material to the substrate. Washing with acetone dissolves or solublizes at least some of these components, allowing them to be rinsed away and excluded from subsequent processing. This increases the purity of the recycled positive-electrode material. In addition, the low solubility of LiOH in acetone is a benefit in embodiments where the thrashing is done in water basified with lithium hydroxide (LiOH). Here, a small amount of LiOH remains on the rinsed solids, which may act to suppress acid hydrolysis of the positive-electrode material during the recycling procedure.

In other embodiments, the collected solids may be rinsed in a different organic solvent, in an aqueous solution of having a suitable pH (e.g. an aqueous LiOH solution having a pH of 11.0-11.5). Supercritical carbon dioxide may also be used. Despite the advantages of the rinsing enacted at 18, this process may be omitted in some embodiments.

At 20 the rinsed solids are dried to remove sorbed water and residual rinse solvent. In the various embodiments here contemplated, the drying may be done in vacuuo, or under a stream of dehumidified (e.g., heated) air or other dry gas, such as nitrogen, argon, or carbon dioxide. In one embodiment, the rinsed solids are dried in a vacuum oven at 140° C. In some examples, drying at 20 also may be omitted.

At 22 the dried solids optionally may be mechanically ground. This grinding step may help to reduce the particle size of the positive-electrode material, to improve yield in subsequent sieving where used. In one non-limiting example, a ball mill may be used for the grinding. In a typical run, a 400-milliliter capacity ball mill is charged with 60 grams of dried solid and 30 # agate spheres of 0.5 to 1 centimeter mixed diameter. The mill may be run for 3 to 5 minutes at 50 Hz, for example. It will be noted that the grinding enacted at 22 may undesirably reduce some of the aluminum substrate to a particle size comparable to that of the positive-electrode material, which may reduce the effectiveness of subsequent purification by size selection. Omitting or shortening the grinding step or modifying the ball-mill frequency may increase product purity, but potentially at the expense of yield.

At 24 the ground solids may be subject to size selection using one or more fine sieves, in order to isolate electrode materials (positive and negative) from pieces of substrate, binder, and steel filings that may be created by cutting the batteries apart during the harvesting step. In one embodiment, the positive electrode material selected for further processing is the portion that passes through a 38 to 45 micron sieve. This fraction, at 22', optionally may be subjected to a second grinding step to further reduce its particle size. Without wishing to be bound by theory, the second grinding step may facilitate relithiation, to restore the stoichiometric lithium content of the recycled positive-electrode material. Other sequences of grinding and size exclusion are contemplated as well. In some embodiments, a fine filtration step conducted in basified liquid medium may be used in lieu of sieving.

At 26, an amount of carbon optionally may be removed from the solids prior to hydrothermal treatment. For example, carbon may be removed by heating the solids at sufficient temperature to burn out the carbon. Removal of carbon also may be accomplished by density methods commonly employed in the mining industry through slurries or with liquids having an intermediate density between carbon, carbon graphite (2.2 grams/cc) and the lithium metal oxides (typically 3 grams/cc). Removal of carbon may help to prevent decomposition of the positive-electrode material during the hydrothermal treatment step. However, it is noted that practice of the disclosed example processes with carbon graphite present does not appear to impede relithiation of the positive electrode material, and as such carbon may left in the solids in some examples. It will be understood that any other suitable method of removing carbon may be utilized, where desired.

At 28, the electrode material is relithiated. Relithiation may help to restore the stoichiometric lithium content of the positive electrode material, for example, by displacing any foreign cations (i.e. impurities) or misplaced cations (i.e. nickel ions that may migrate to lithium sites in a lattice) that may be present. As mentioned above, electrochemical techniques may be used to relithiate an electrode material, and an oxidizing agent may be used to maintain a metal atom in the electrode material lattice in a desired oxidation state, which may help to stabilize the lattice in a desired phase.

Figure 2A:
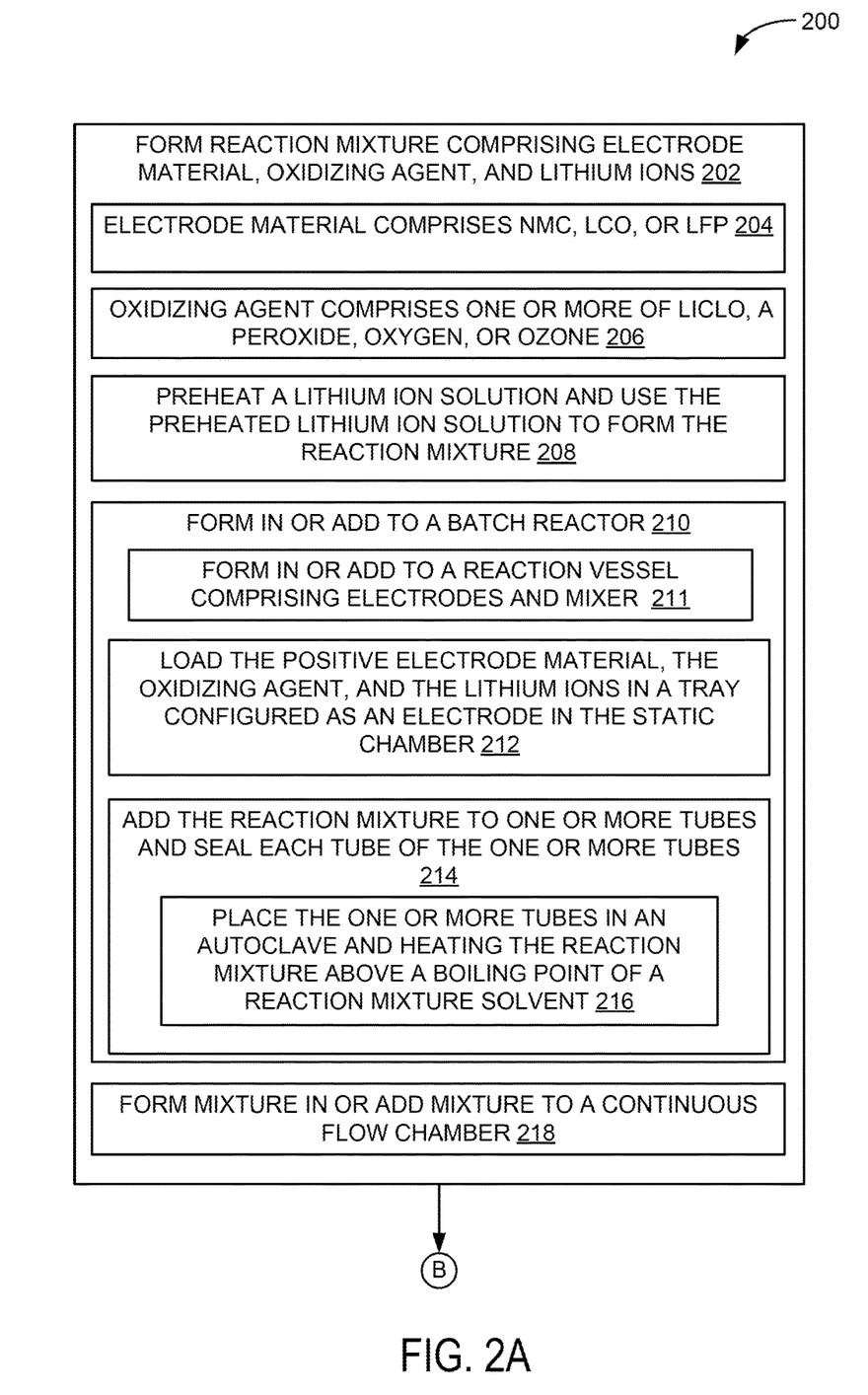
FIGS. 2A and 2B show a flow diagram illustrating an example method for recycling an electrode material of a lithium-ion battery.
Figure 2B:
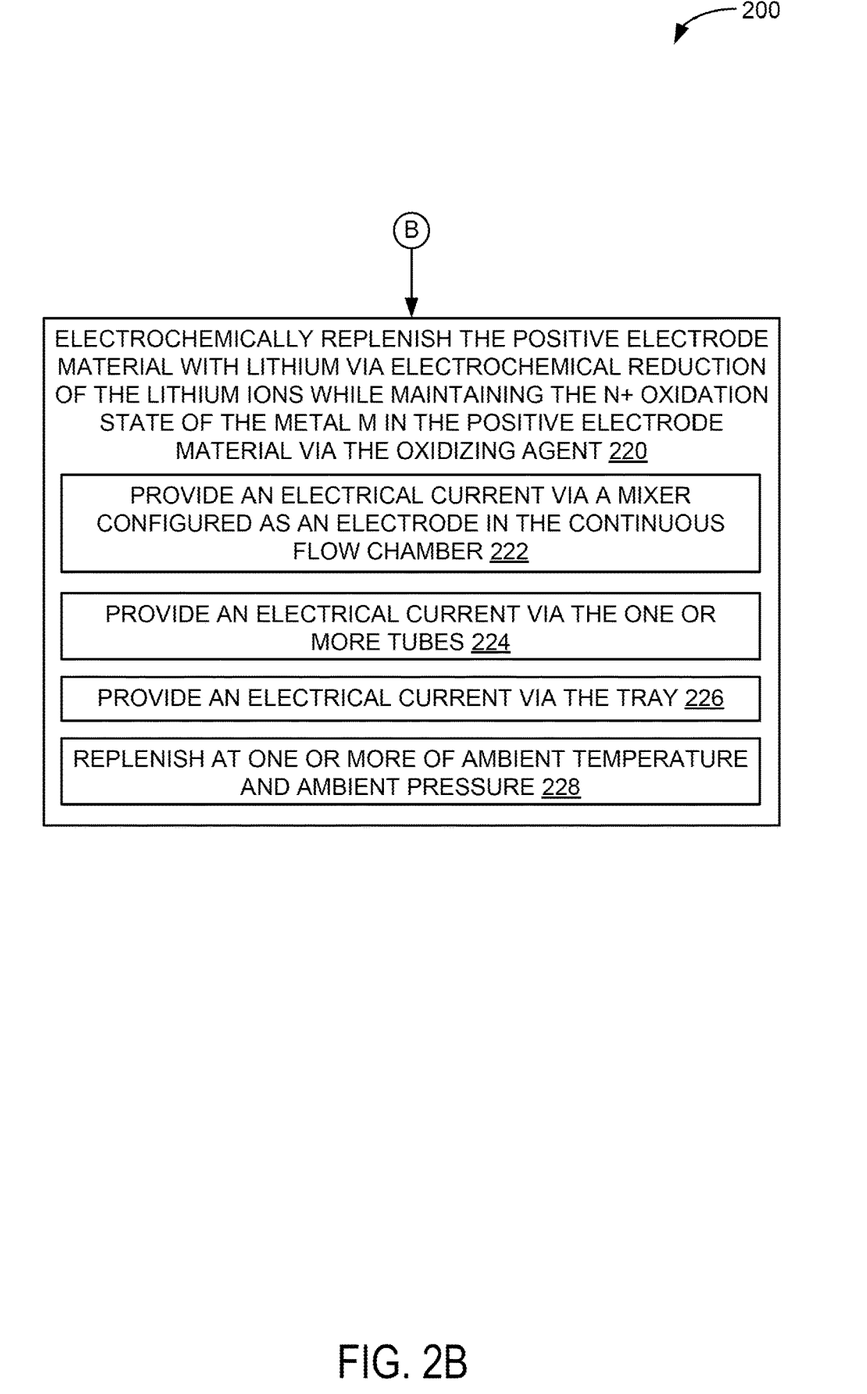

FIGS. 2A and 2B illustrate aspects of an example method 200 for electrochemically relithiating an electrode material. It will be appreciated that the following description of method 200 is provided by way of example and is not meant to be limiting. In other examples, a method to electrochemically relithiate an electrode material may include additional and/or alternative steps relative to those illustrated in FIGS. 2A and 2B. Further, it is to be understood that the individual processes of method 200 may be performed in any suitable order, and that one or more steps may be omitted from method 200 without departing from the scope of this disclosure.

Method 200 includes, at 202, forming a reaction mixture comprising the positive electrode material, an oxidizing agent, and lithium ions. Any suitable positive electrode material may be used. Examples include NMCs, LCO, or LFP, as indicated at 204.

As described above, the use of an oxidizing agent may help to avoid reduction of metal ions during the relithiation process. Without wishing to be bound by theory, various conditions that may be encountered in a relithiation process may tend to reduce metal ions in the positive-electrode material. For example, deoxygenation in NCA or NMC materials occur by the reaction $LiNiO_2 \rightarrow Li_{(1-x)}NiO_{(2-y)} + xLi^+ + yO_2^-$ (oxygen loss) $\rightarrow NiO$. Thus, incorporating an oxidizing agent may help to avoid such metal ion reduction.

Addition of an oxidizing agent during relithiation also may obviate the need for any oxidizing steps downstream, such as sintering under oxygen or other oxidizing atmosphere, thus simplifying the recycling process.

Any suitable oxidizing agent may be used in the relithiation solution. Examples include but are not limited to lithium hypochlorite (LiClO), peroxides such as hydrogen peroxide or lithium peroxide, oxygen gas, and ozone, as indicated at 206. Other examples include, permanganates, chorine, hypochlorites, chlorates, perchlorates, percarbonates, perborates, iron, fluorine, sulfite, beryllium fluoride, boron fluoride, carbonate, nitrate, arsonate, phosphate, antimonite, tellurate, iodate, $TiCl_6$, $SnCl_6$, germanium fluoride, platinum hexchloride, chromate, molybdate, or any compound having an oxygen atom capable of accepting an extra electron. In some examples, hydrogen fluoride may be added along with the oxidizing agent, as fluorination may help to further stabilize the desired oxidation state(s) of the nickel. In some examples, it may be desirable to remove byproducts of oxidation. For example, $Fe^{2+}$ oxidizing agent may produce an $Fe^{2+}$ species that may not be desirable in the end product.

In some examples, a reducing agent may be added to the relithiation solution. For some electrode materials, such as lithium metal phosphates (e.g., lithium iron phosphate (LFP), lithium vanadium phosphate (LVP), and lithium manganese phosphate (LMnP)), the reducing agent may help to maintain the metal phosphate cation (e.g., Fe') in a desired oxidation state. Any suitable reducing agent may be used. Some examples of reducing agents include, but are not limited to, $H_2$, oxalates, citric acid, ascorbic acid, hydrazine, and sugars. In some examples, the reducing agent may be generated in situ. For example, in a concrete reactor, the concrete can evolve $H_2$, which may act to maintain the cation in the desired oxidation state.

The reaction mixture may be formed either in a liquid phase or a solid phase. To form the reaction mixture in a liquid phase, the oxidizing agent and the lithium ions are mixed with a solvent along with the electrode material. To form in the solid phase, the reactants may be mixed as powders, thereby forming a mixture of powders to which a solvent may be later added.

In various embodiments, the lithium ion source may comprise lithium hydroxide, a lithium halide, lithium sulfate, lithium sulfite, lithium sulfide, lithium nitrate, lithium nitride, lithium oxide, lithium peroxide, lithium oxalate, lithium phosphate, lithium chlorate, lithium perchlorate, or lithium hypochlorite. In some examples, the reaction mixture may comprise a liquid-phase mixture having a lithium ion concentration of 1-5M. In other examples, the solution may be saturated or supersaturated with the lithium ions or have excess lithium salt. In yet other examples, the solution may have any other suitable concentration of lithium ions.

In some examples, the reaction mixture may comprise dilute nickel. For example, a relithiation solution may be reused between batches. It has been found that the hydrothermal relithiation solution comprises dissolved Ni' (a light apple green solution), and that the concentration of the dissolved nickel appears to remain at a relatively consistent concentration (with consistent coloration) from batch to batch. For example, a concentration of $Ni^{2+}$ (e.g. in the form of nickel hydroxide) may range from 0.001M-0.010M. Thus, having some dilute nickel in the hydrothermal solution, whether added prior to relithiation (e.g. as Ni(II) nitrate) or retained from previous batches using the same solution, may help to retain nickel in the electrode material lattice.

In some examples, the solution may be pre-heated prior to electrochemical processing. Such pre-heating may help to partially drive the relithiation reaction. This may allow a shorter duration of electrochemical processing to be used to complete the relithiation reaction, as indicated at 208. As a more specific example, in one non-limiting embodiment a reaction solution may be preheated to 180-220° C. under ambient pressure for a suitable duration for partial relithiation to occur. This solution then may be introduced to either a batch or continuous flow reactor for electrochemical relithiation to drive the reaction to completion. Heating to or above 180° C. may encourage the crystal lattice of the positive electrode material to rearrange from a cubic phase to a layered phase with a suitable reaction rate. However, decomposition may start to occur above 225° C. Further, a digestion process also may occur during preheating, in which residual binders may be removed from the positive electrode material, and particles of the positive electrode material may be freed from carbon. Such preheating may be performed in an electrochemical reactor, or may be performed in a separate reactor from which the preheated solution is added to the electrochemical reactor. In some examples, a solvent loop may be used, wherein solvent is again added to the preheating reactor after recovery of electrochemically relithiated electrode material from the solvent.

In other examples, as mentioned above, a reaction mixture may be formed in the solid state initially. In such examples, a lithium ion source, oxidizing agent and electrode material may be mixed in solid form (e.g. as powders), and then introduced into a reactor. Steam may then be introduced into the reactor, and mix with the solids to form the reaction mixture. As a more specific example, a hygroscopic lithium source may be used in the reaction mixture that incorporates water from the steam to thereby form a slurry before and/or during electrochemical processing.

Figure 3:
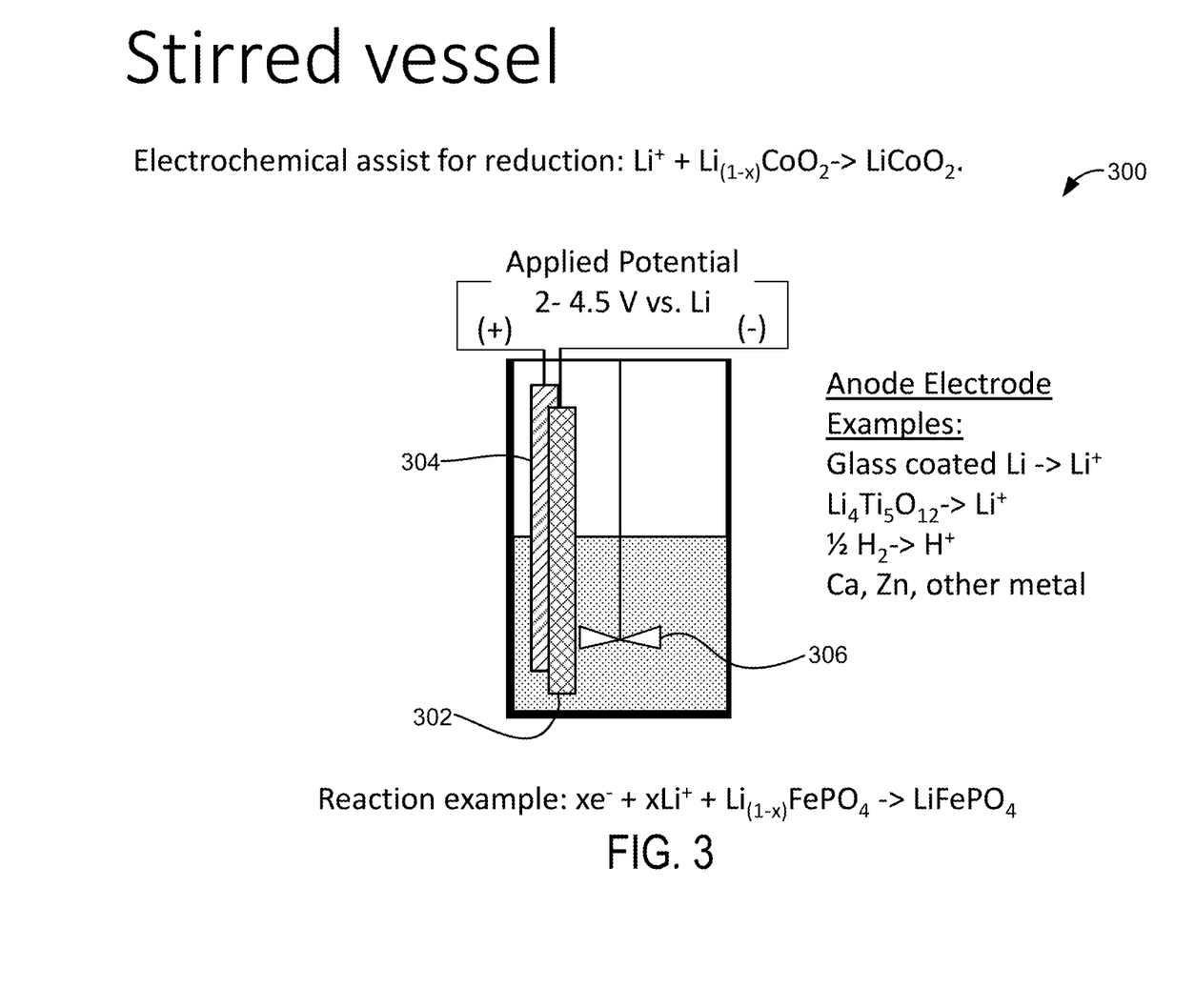
FIG. 3 shows an example of a batch reactor system for recycling an electrode material of a lithium-ion battery.

In some examples, the mixture may be formed in or added to a batch reactor, as indicated at 210, for electrochemically processing in a batch process. Various types of batch reactors may be used. For example, as indicated at 211, the reaction mixture may be formed in or added to a reaction vessel comprising electrodes and a mixer to mix the solution during a batch relithiation process. FIG. 3 shows one example of a batch reactor 300 comprising an anode 302, a cathode 304, and a mixer 306. In this example, the cathode 304 is the working electrode, and the anode 302 is the counter electrode. The working electrode is in contact with the electrode material being relithiated as the material is stirred in solution, and may be formed from any suitable material, such as metals that are chemically stable and resistant to corrosion in the reaction environment (such as nickel, palladium, platinum, or graphite). The anode may have any suitable configuration. Examples include glass-coated lithium metal (which undergoes a lithium oxidation half-reaction to release $Li^+$ into the reaction mixture), lithium titanate ($Li_4Ti_5O_{11}$) (which similarly releases $Li^+$ when oxidized), a hydrogen electrode, or any other sacrificial metal (e.g. Ca, Zn, etc.). When using a sacrificial metal, the sacrificial metal serves as an electron source, and salts resulting from oxidation of the sacrificial metal are removed from the reaction mixture to prevent contamination. During relithiation, a potential of between 2 and 4.5 V may be applied between the electrodes. Example reactions include $Li^+ + Li_{(1-x)}CoO_2 \rightarrow LiCoO_2$ and $xe^- + xLi^+ + Li_{(1-x)}FePO_4 \rightarrow LiFePO_4$.

The applied potential during electrochemical processing may decrease activation barriers for relithiation. In this manner, the reaction may be run at lower temperatures (e.g. 150° C. or less) in some examples. Suitable examples of reaction temperatures may include temperatures of between 25-150° C. In other examples, higher temperatures may be used, up to 225° C. For example, the reaction may be run at 180° C. in a large-scale concrete reactor. When the reaction mixture comprises an aqueous solution, the reaction may be run at ambient pressure at temperatures of less than 100° C.

Figure 4:
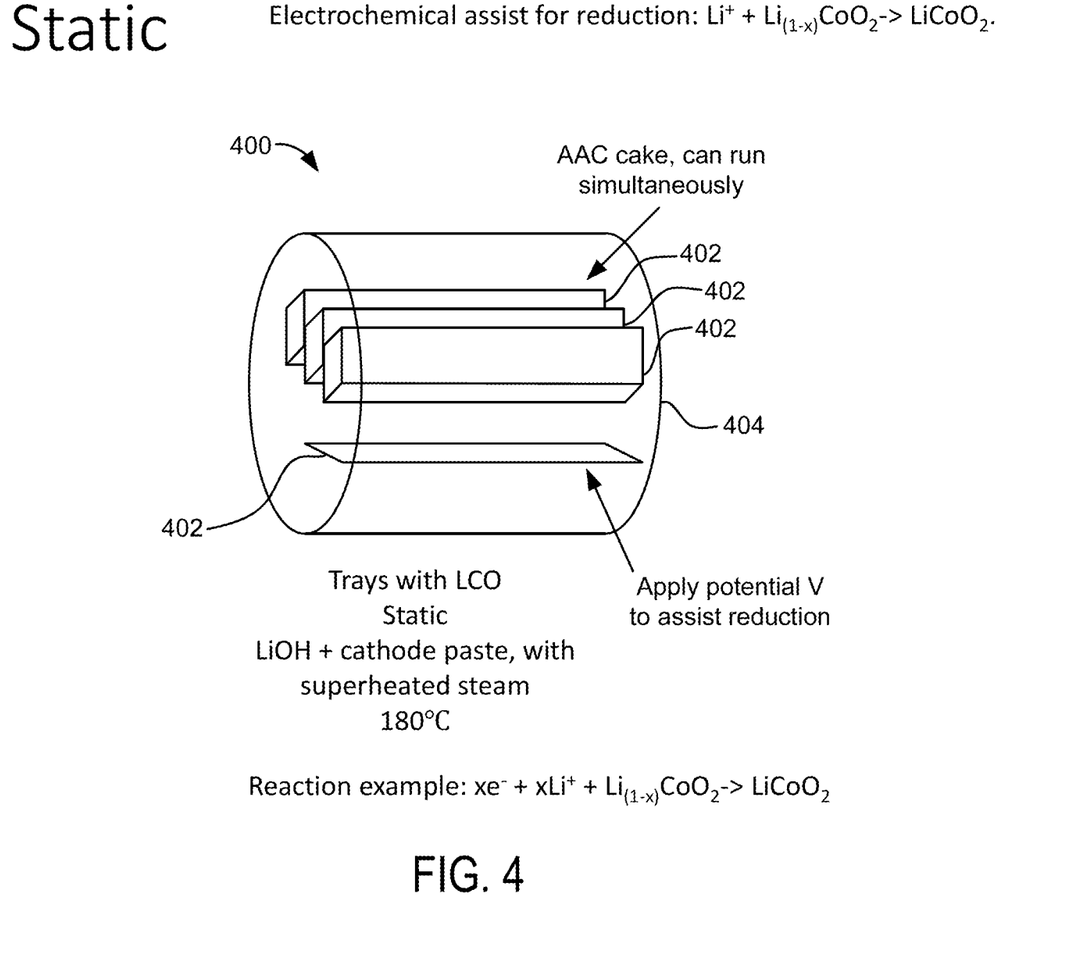
FIG. 4 shows another example of a batch reactor system for recycling an electrode material of a lithium-ion battery.
Figure 5:
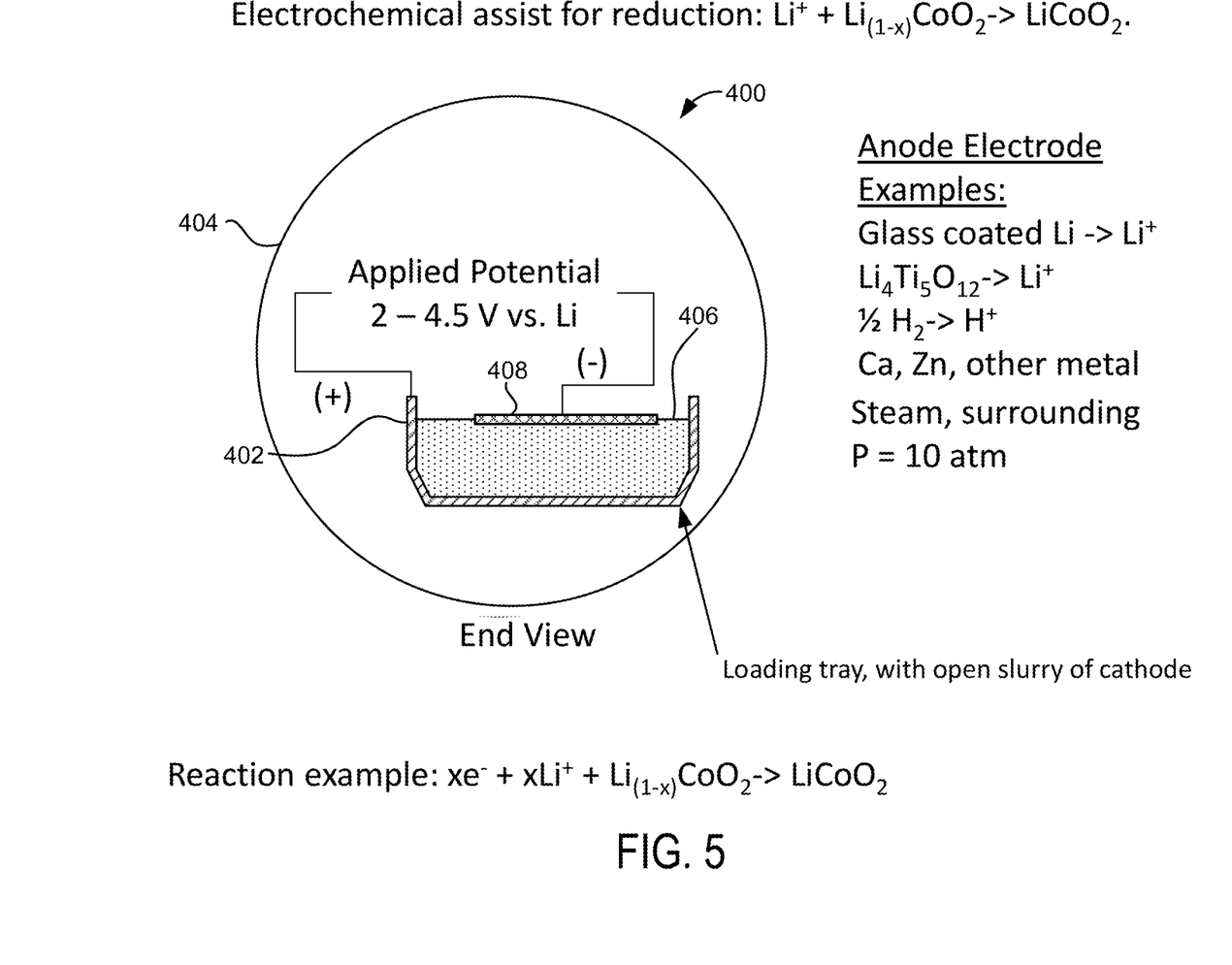
FIG. 5 shows another example of a batch reactor system for recycling an electrode material of a lithium-ion battery.

As mentioned above, in some examples a solid mixture of reactants may be added to a tray (wherein "tray" indicates any container for holding reactants that is at least partially open, as opposed to a sealed container), which then may be inserted into a steam reactor for processing, as indicated in FIG. 2A at 212. FIG. 4 schematically shows an example batch reactor 400 configured for such use, and FIG. 5 illustrates an example tray for use in such a batch reactor. The batch reactor 400 comprises a plurality of trays 402 contained within a chamber 404 configured to be pressurized with steam, though in some examples a reactor may include a single tray. The steam may be introduced at a temperature in a range of 80° C.-400° C., for example, and may have a pressure within a range of 1-221 Bar. Mixtures of reactants (e.g. electrode material, lithium ion source, and oxidizing agent) are placed into the one or more trays, and turned into slurries by the high-temperature and high-pressure steam. In other examples, water or other suitable solvent may be added to the reactant mixture before steam is introduced into the mixture. The high-pressure steam may be absorbed by the reactant mixture, which may increase a level of liquid in the tray. The reactor 400 thus behaves similarly to a hydrothermal reactor, in that the high-pressure, super-heated steam may form liquid phase mixtures in the trays.

The high temperature steam/liquid phase may help to drive the relithiation reaction partially to completion. Further, an electrical potential may be applied to electrochemically drive the reaction to completion. As shown in FIG. 5, the tray 402 may be configured as an electrochemical reactor comprising a working electrode in contact with the slurry of reactants 406, and a counter electrode 408 that is contacted with the liquid phase in the tray but not with the anode. The electrodes in the example of FIGS. 4-5 may be made from the materials described above with reference to FIG. 3.

Returning briefly to FIG. 2A, in some examples, the reaction mixture may be added to individual tubes, followed by sealing the tubes, as indicated at 214. The tubes may then be placed into a suitable heating apparatus, such as an autoclave, as indicated at 216. The tubes may then be heated to heat the reaction mixture to a temperature above a boiling point of the reaction mixture solvent. The pressure and temperature inside the tubes may drive the relithiation reaction partially to completion. Further, an electrical potential may be applied either during or after such heating.

Figure 6:
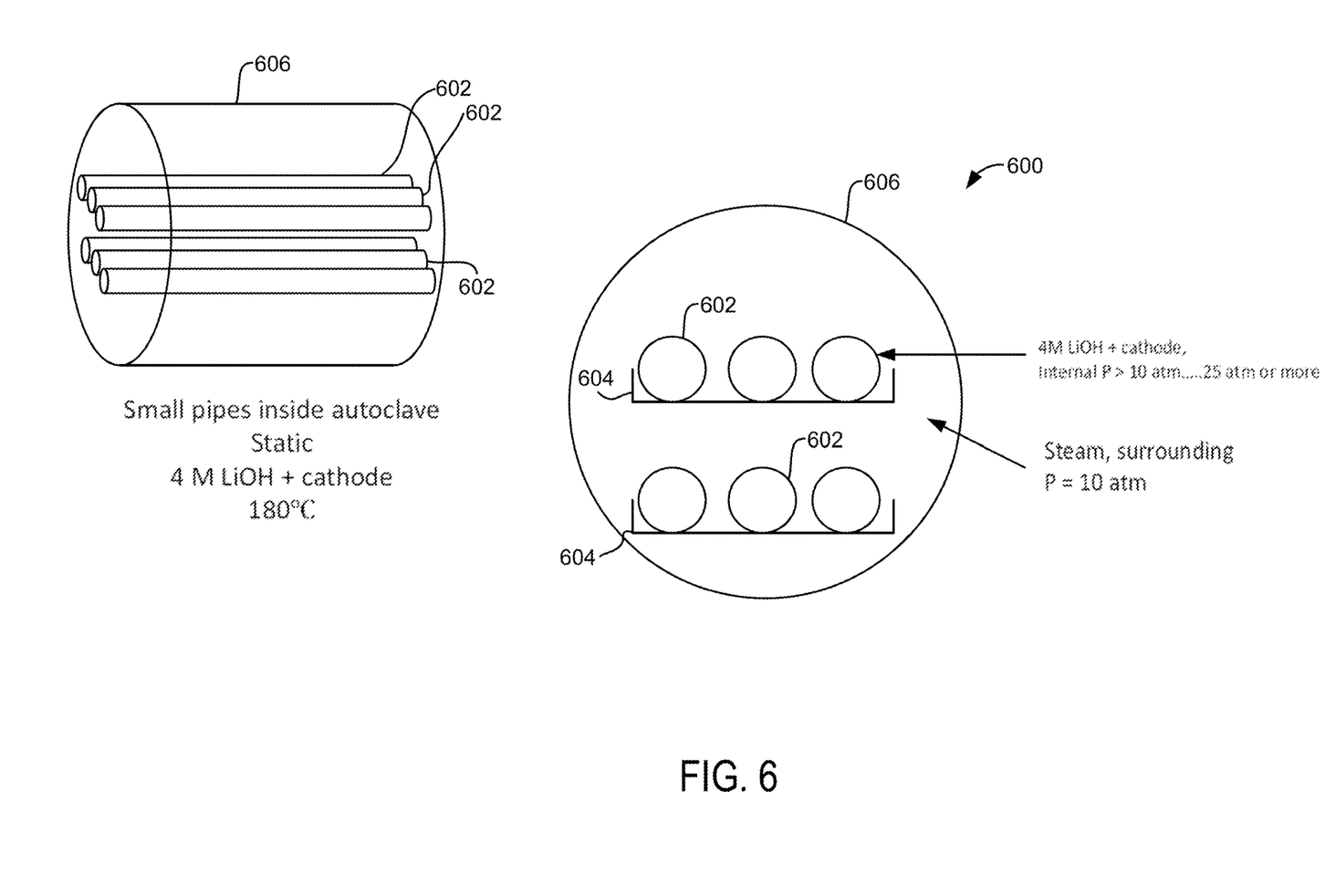
FIG. 6 shows another example batch reactor system.

FIG. 6 shows one example of a reactor system 600 that includes a plurality of tubes 602. In some examples, each of the tubes 602 is a high-pressure sealed tube with any suitable length and diameter, depending upon a size of an autoclave into which the tubes are inserted. It will be appreciated that the tubes 602 may be configured in any other suitable manner.

By sealing the one or more tubes 602 within the autoclave 606, the reaction mixture may be subjected to greater pressures than in the autoclave 606 alone. In the example of FIG. 6, the autoclave 606 is heated to 180-220° C. and pressurized to 10 atm. The pressure inside of the one or more tubes 602 is raised to greater than 10 atm, such as to 25 atm or more. In some examples, each of the one or more tubes 602 comprises an anode and a cathode, as described above with reference to FIG. 3. In this manner, an electrical potential may be applied to drive relithiation.

Figure 7:
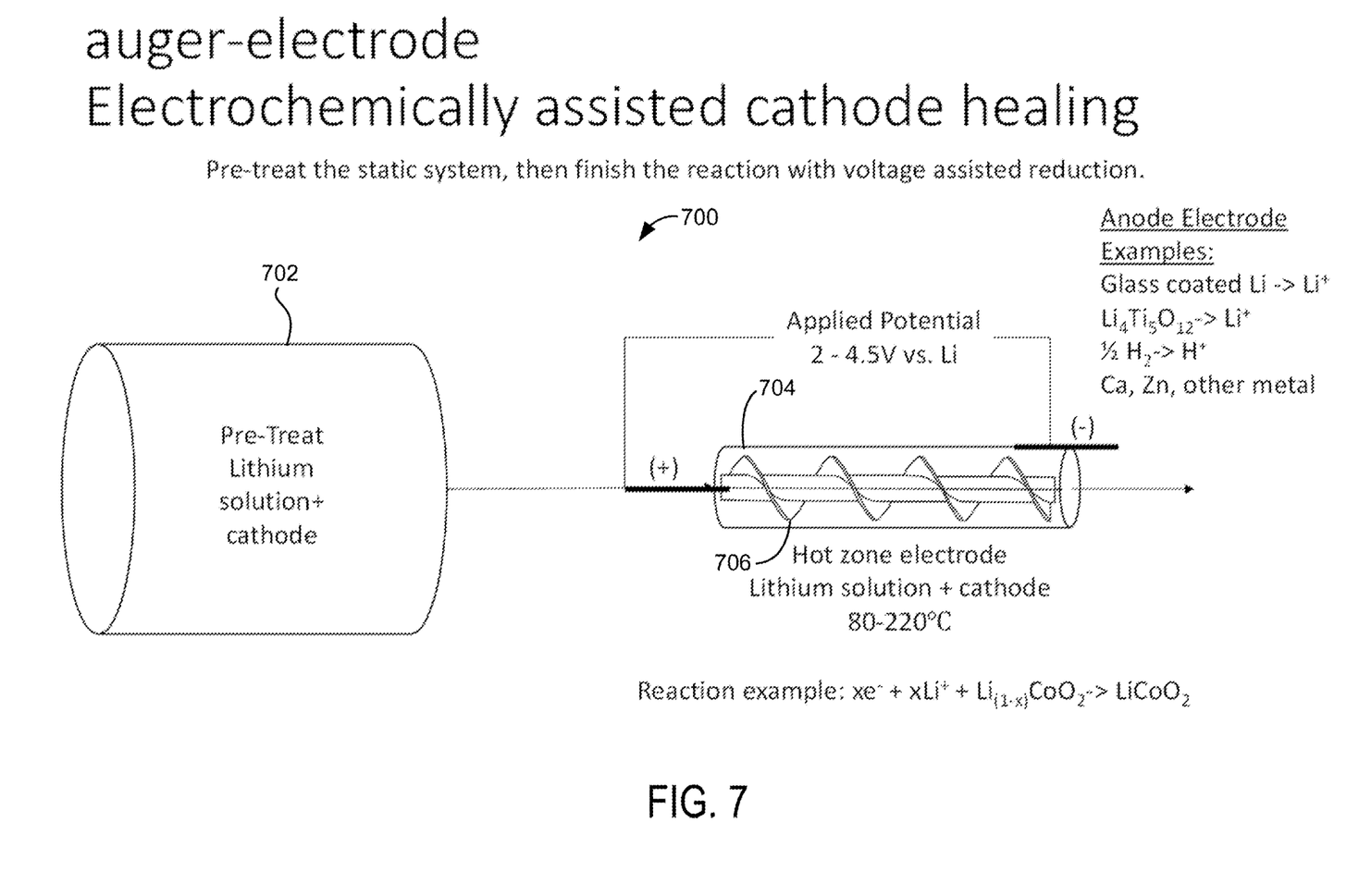
FIG. 7 shows another example of a continuous-flow reactor system including a conveyor.

As mentioned above, the reaction mixture may be formed in or added to a continuous flow reactor system, as indicated in FIG. 2A at 218. FIG. 7 schematically shows one example of a reactor system 700 for recycling a positive electrode material of a lithium-ion battery that includes a continuous-flow chamber. It will also be appreciated that the reaction mixture may be formed in a batch process or in some combination of a batch and continuous-flow process. In some examples, the positive electrode material initially processed in a batch system to drive the relithiation reaction to partial completion, and then the relithiation reaction is driven to completion in a continuous-flow reactor. In such a system, the batch reactor may have a larger volume than the continuous flow reactor.

In the example of FIG. 7, the reaction mixture is formed in a pre-treatment zone 702, where it is heated before being introduced into a reaction chamber. In some examples, the reaction mixture is heated to 180-220° C. In various examples, the pre-treatment zone 702 may comprise a batch reactor vessel or a continuous flow reactor. The reaction mixture then flows or is pumped into continuous flow chamber 704. The continuous-flow chamber 704 includes a conveyor configured to move the reaction mixture through the continuous-flow chamber 704. In some examples, the continuous-flow chamber 704 may be used to maintain reaction conditions similar to larger reaction vessels.

In the example of FIG. 7, the conveyor takes the form of an auger 706, but any other suitable conveyor may be used. In some examples, at least a portion of the conveyor may act as a working electrode, and the reactor sides as a counter electrode. In other examples, the conveyor may be the counter electrode, and the reactor sides the working electrode. In yet other examples, one or more of the electrodes may be embedded within the reactor sides so as to contact the reaction mixture. The electrodes in the example of FIG. 7 may be made from the materials described above with reference to FIG. 3.

In some examples, in the continuous-flow chamber 704, recycling occurs at a higher temperature and/or pressure than in the pre-treatment zone 702. For example, the positive electrode material may be treated with a solution of LiOH at 180-220° C. and at a pressure of 25 atm. To maintain temperature differentials between the pre-treatment and the hot zone, the pre-treatment may be conducted at a lower temperature and pressure (e.g. 120° C. and 1 atm) so that the LiOH solution does not boil. In other examples, an airlock is used to separate the pre-treatment and the hot zone. In yet other examples, the conveyor may maintain a suitable differential between each zone. Another suitable lithium solution includes concentrated, buffered solutions of $RO_2H$/$RO_2Li$ (R=organic functionality) with 1>$RO_2H$:$RO_2Li$>1 to adjust the pH to mildly acidic (<pH7), neutral, or mildly basic (>pH7) conditions.

With reference now to FIG. 2B, the method 200 includes, at 220, electrochemically replenishing the positive electrode material with lithium via electrochemical reduction of the lithium ions while maintaining the n+ oxidation state of the metal m in the positive electrode material via the oxidizing agent. Different electrode configurations may be used in various embodiments. For example, at 222, the method 200 may include electrochemically replenishing the positive electrode material by providing an electrical current via a conveyor configured as an electrode in a continuous flow chamber. For example, as described above with reference to FIG. 7, the conveyor 706 or a wall of the continuous-flow chamber 704 may be configured as a working electrode. As another example, at 224, the reaction mixture may be added to one or more tubes, and the electrical current may be applied via the one or more tubes as described above with reference to FIGS. 3 and 6. In yet other examples, at 226, the electrical current may be provided via a tray holding a slurry of reactants, as described above with reference to FIG. 5.

By providing an electrical current through the reaction mixture, relithiation may be performed at one or more of ambient temperature and ambient pressure, as indicated at 228. In other examples, electrochemical relithiation may be performed at elevated pressure and temperature.

In some examples, the electrical potential applied for the relithiation reaction may be reversed one or more times during a relithiation process to oxidize transition metals within the positive electrode material, in addition to or in place of using an oxidizing agent.

As a more specific example, an oxidizing bias may be applied to oxidize an NMC material, and a reducing bias may be applied to relithiate the material. In this manner, the positive electrode material may be replenished while maintaining the oxidation state of the material. In other examples, the positive electrode material may be oxidized and reduced in separate stages.

The alternating current may take any suitable form. In some examples, an oxidizing current and a reducing current are alternated for equal durations. In other examples, the oxidizing current and the reducing current may be applied for different durations. For example, the positive electrode material may be subjected to the reducing current for a relatively long period, with occasional pulses of opposite polarity. In other examples, different electrodes are used to electrochemically oxidize and electrochemically reduce the positive electrode material.

With reference again to FIGS. 1, 2A and 2B, a plurality of competing reactions may occur at various stages of the method 10 and/or the method 200, which may result in a complex mixture of chemical products. For example, Co(IV) in the positive electrode material may be reduced to Co(III). In other examples, manganese may dissolve, resulting in decomposition of the positive electrode material. In other examples, the oxidizing agent may produce undesirable byproducts. For example, an $Fe^{2+}$ oxidizing agent may produce an undesirable $Fe^{2+}$ species.

Accordingly, in some examples, the reaction mixture is flushed after replenishing the positive electrode material, and the positive electrode material is rinsed to remove potential impurities. In some examples, the reaction mixture is drained and replaced by a fresh lithium ion solution. In other examples, the reaction mixture is partially drained and backfilled with the fresh lithium ion solution. In some examples, a potential is applied to electrochemically reduce the positive electrode materials while rinsing.

The reaction mixture may be flushed and the positive electrode material may be rinsed at any suitable stage. For example, when the positive electrode material is oxidized and reduced in separate stages, the reaction mixture may be flushed and the positive electrode material rinsed after oxidizing the positive electrode material, and again after reducing the positive electrode material.

Continuing in FIG. 1, at 16' the cooled, treated solids are collected, and at 30 the solids may be rinsed, for example to remove excess LiOH. Some materials may potentially be sensitive to the manner of rinsing at this stage of the process. For example, neutral-to-acidic conditions may impact the electrochemical properties of the positive-electrode material (e.g., capacity and current capability). Without wishing to be bound by theory, sensitivity to acid hydrolysis may be higher at this stage than earlier stages for some positive-electrode materials, because the binder has been mostly eliminated. Accordingly, the collected solids may be rinsed with water basified by LiOH to a pH in the same range as used in rinsing step 18—e.g., pH 11.0 to 13.5 for NCA. Alternatively, the collected solids may be rinsed with less basic or even deionized water, while, at 32, the pH of the filtrate is continuously monitored. For electrodes sensitive to base (e.g., lithium-metal-phosphates, LFP, LVP, LMnP), another suitable lithium solution includes concentrated, buffered solutions of $RO_2H/RO_2Li$ (R=organic functionality) with $1 > RO_2H:RO_2Li > 1$ to adjust the pH to mildly acidic (<pH7), neutral, or mildly basic (>pH7) conditions.

Other suitable solvents for rinsing may include, but are not limited to, nonaqueous solvents such as liquid carbon dioxide, supercritical carbon dioxide, methanol, ethanol, isopropol alcohol, t-butanol, n-butanol, glycol, polyethelene glycol, bromoform, di-bromomethane, bromal, tetraboromethane, bromine, di-bromoethane; solutions of ammonium metatungstate, sodium polytungstate, and potassium tetraiodomercurate(II), and/or solutions thereof. Rinsing is ended when the pH of the filtrate falls within the desired range. For a typical 500-gram batch of positive-electrode material, a total of 4 liters of wash water may be used, prior to the pH dropping into the target range. In another embodiment, 4 liters of aqueous LiOH within a desired pH range may be used.

At 20' the rinsed, treated solids may be dried in vacuo at 150 to 160° C., and at 22', the solids may be ground again if a smaller particle size is desired.

In some examples, the method 10 further comprises, at 34, heating the positive electrode material after electrochemically replenishing the positive electrode material with lithium. In some examples, the positive electrode material is heated to one or more temperatures within a range of 300-1500° C. to calcine and/or anneal the material. The competing reactions mentioned above may result in conversion of some layered cathode material into spinel form. As one example, spinel LCO may be formed at temperatures of 80° C. Thus, the heating process converts residual spinel structures into layered forms. Furthermore, the heating process dehydrates and dries the material, removing any excess water remaining from prior reactions.

In some examples, the positive electrode material is annealed by heating the material in a dry oven at 300-1500° C., under air and at ambient pressure. In other examples, the positive electrode material is annealed under more oxidizing conditions. For example, excess oxygen may be provided while the material is annealing.

It will be understood that the configurations and/or approaches described herein are exemplary in nature, and that these specific embodiments or examples are not to be considered in a limiting sense, because numerous variations are possible. This disclosure also includes all novel and non-obvious combinations and sub-combinations of the above articles, systems, configurations, methods, and other features, functions, acts, and/or properties disclosed herein, as well as any and all equivalents thereof.

The specific processes described herein may represent one or more of any number of strategies. Some of the process steps described and/or illustrated herein may, in some embodiments, be omitted without departing from the scope of this disclosure, and/or additional steps may be used. Likewise, the indicated sequence of the process steps may not always be required to achieve the intended results, but is provided for ease of illustration and description. One or more of the illustrated actions, functions, or operations may be performed repeatedly, depending on the particular strategy being used.

The invention claimed is:

1. A method of recycling a positive electrode material of a lithium-ion battery, the positive electrode material comprising a metal m having a n+ oxidation state ($m^{n+}$), the method comprising:
   forming a reaction mixture comprising the positive electrode material, an oxidizing agent, and lithium ions; and
   electrochemically replenishing the positive electrode material with lithium via electrochemical reduction of the lithium ions while maintaining the n+ oxidation state of the metal m in the positive electrode material via the oxidizing agent.

2. The method of claim 1, wherein forming the reaction mixture comprising the positive electrode material comprises forming the reaction mixture with lithium nickel cobalt oxide or lithium nickel manganese cobalt oxide, wherein the metal m is nickel, and wherein the oxidation state n+ is 3+.

3. The method of claim 1, wherein forming the reaction mixture comprises forming the reaction mixture in a continuous flow chamber.

4. The method of claim 3, wherein electrochemically replenishing the positive electrode material comprises providing an electrical current via a conveyor configured as an electrode in the continuous flow chamber.

5. The method of claim 1, wherein forming the reaction mixture comprises forming the reaction mixture in a static chamber.

6. The method of claim 5, wherein forming the reaction mixture comprises loading the positive electrode material, the oxidizing agent, and the lithium ions in a tray configured as an electrode in the static chamber.

7. The method of claim 1, wherein forming the reaction mixture comprises forming the reaction mixture in one or more tubes and sealing each tube of the one or more tubes.

8. The method of claim 7, further comprising placing the one or more tubes in an autoclave and heating the reaction mixture above a boiling point of a reaction mixture solvent.

9. The method of claim 7, wherein electrochemically replenishing the positive electrode material with lithium comprises providing an electrical current via the one or more tubes.

10. The method of claim 1, wherein the oxidizing agent comprises one or more of LiClO, a peroxide, oxygen, and ozone.

11. The method of claim 1, further comprising adding a reducing agent to the reaction mixture.

12. The method of claim 1, further comprising annealing the positive electrode material after electrochemically replenishing the positive electrode material with lithium.

13. The method of claim 12, wherein annealing the positive electrode material comprises annealing at 300-900° C.

14. The method of claim 1, wherein electrochemically replenishing the positive electrode material with lithium comprises replenishing at one or more of ambient temperature and ambient pressure.

15. A method of recycling a positive electrode material of a lithium-ion battery, the positive electrode material comprising a lithium nickel manganese cobalt oxide having nickel in a 3+ oxidation state, the method comprising:
   forming a reaction mixture comprising the positive electrode material, lithium ions, and an oxidizing agent;
   maintaining the 3+ oxidation state of the nickel in the positive electrode material via the oxidizing agent; and
   electrochemically replenishing the positive electrode material with lithium via electrochemical reduction of the lithium ions.

16. The method of claim 15, further comprising annealing the positive electrode material.

17. The method of claim 15, wherein the oxidizing agent comprises one or more of LiClO, a peroxide, oxygen, and ozone.

* * * * *